(12) United States Patent
Ozer

(10) Patent No.: US 7,526,102 B2
(45) Date of Patent: Apr. 28, 2009

(54) SYSTEM AND METHOD FOR OBJECT TRACKING AND ACTIVITY ANALYSIS

(75) Inventor: Ibrahim Burak Ozer, North Wales, PA (US)

(73) Assignee: Verificon Corporation, Lawrenceville, NJ (US)

( * ) Notice: Subject to any disclaimer, the term of this patent is extended or adjusted under 35 U.S.C. 154(b) by 0 days.

(21) Appl. No.: 11/520,112

(22) Filed: Sep. 13, 2006

(65) Prior Publication Data

US 2008/0130948 A1 Jun. 5, 2008

Related U.S. Application Data

(60) Provisional application No. 60/716,544, filed on Sep. 13, 2005.

(51) Int. Cl.
*G06K 9/00* (2006.01)
(52) U.S. Cl. .................................................. 382/103
(58) Field of Classification Search ................. 382/103, 382/100, 104, 107, 173, 236, 115, 118, 298–299, 382/224, 209, 217–220; 348/169–172, 14.1–14.16, 348/142–143; 375/240.16
See application file for complete search history.

(56) References Cited

U.S. PATENT DOCUMENTS 6,567,116 B1 * 5/2003 Aman et al. ................ 348/169
7,149,325 B2 * 12/2006 Pavlidis et al. ............. 382/103
7,187,783 B2 * 3/2007 Moon et al. ................ 382/103
2003/0053659 A1 * 3/2003 Pavlidis et al. ............. 382/103
2005/0012817 A1 * 1/2005 Hampapur et al. .......... 348/143

OTHER PUBLICATIONS

Fairchild, Mark D., "Color Appearance Models," Addison-Wesley (1998).
Grimson et al., "Using Adaptive Tracking To Classify and Monitor Activities In a Site," CVPR (1998).
Grimson et al., "Learning Patterns Of Activity Using Real-Time Tracking," IEEE Transactions on PAMI, vol. 22, No. 8 (2000).
Forsyth, D.A. et al., "Computer Vision: A Modern Approach," Pearson Education (2003).
International Search Report for PCT/US06/035749 (Mar. 21, 2008).

* cited by examiner

*Primary Examiner*—Sherali Ishrat
(74) *Attorney, Agent, or Firm*—Lowenstein Sandler P.C.

(57) ABSTRACT

Embodiments of the invention relate to methods and systems for providing real-time video surveillance of crowded environments. The method consists of several object detection and tracking processes that may be selected automatically to track individual objects or group of objects based on the resolution and occlusion levels in the input videos. Possible objects of interest (OOI) may be human, animals, cars etc. The invention may be used for tracking people in crowded environments or cars in heavy traffic conditions.

7 Claims, 6 Drawing Sheets

Initialization of Background Model

Updating Background Model

Object Detection for low resolution and high occlusion levels

Flow Estimation of OOI Groups

Tracking Process

SYSTEM AND METHOD FOR OBJECT TRACKING AND ACTIVITY ANALYSIS

CROSS-REVERENCE TO RELATED APPLICATION

This application claims the benefit of U.S. Provisional Patent Application No. 60/716,544, filed on Sep. 13, 2005, the entire contents of which are hereby incorporated by reference herein.

FIELD OF THE INVENTION

Embodiments of the invention relate to methods and systems for providing video surveillance, and, more particularly, to methods and systems for providing video surveillance of crowded environments.

BACKGROUND OF THE INVENTION

Different approaches exist for object detection and tracking. However, most of these methods and systems are suitable to detect individual objects with low occlusion and high resolution levels, as is known to those of skill in the art. Furthermore, the successful extraction of and object of interest (OOI) depends in general on the complexity of the background scene or the availability of the background scene without any foreground objects.

Thus, there is a need for systems and methods for improved foreground object extraction, detection and tracking for smart camera systems.

SUMMARY OF THE INVENTION

Embodiments of the present invention satisfy these and other needs by providing a system and method for object tracking and activity analysis. Embodiments of the invention relate to an apparatus and method for object tracking and activity analysis in crowded environments comprising a means for eliminating the background and finding the foreground regions using color models in uncompressed and compressed domains based on: a) using high-level temporal semantics (e.g., statistics (i.e. mean, variance with confidence levels) of duration and repetition patterns corresponding to mixture of model distributions with different color models) for improved background model adaptation; b) using high-level scene semantics (e.g., statistics for object based versus view based scene changes) for improved background model adaptation; c) combining high-level temporal and scene semantics for analysis of the surveillance areas; and d) using temporal statistics to improve the robustness of initial background analysis without requiring the scene model without foreground objects.

BRIEF DESCRIPTION OF THE DRAWINGS

Embodiments of the invention can be understood from the detailed description of exemplary embodiments presented below, considered in conjunction with the attached drawings, of which.

DETAILED DESCRIPTION OF THE INVENTION

Figure 1:
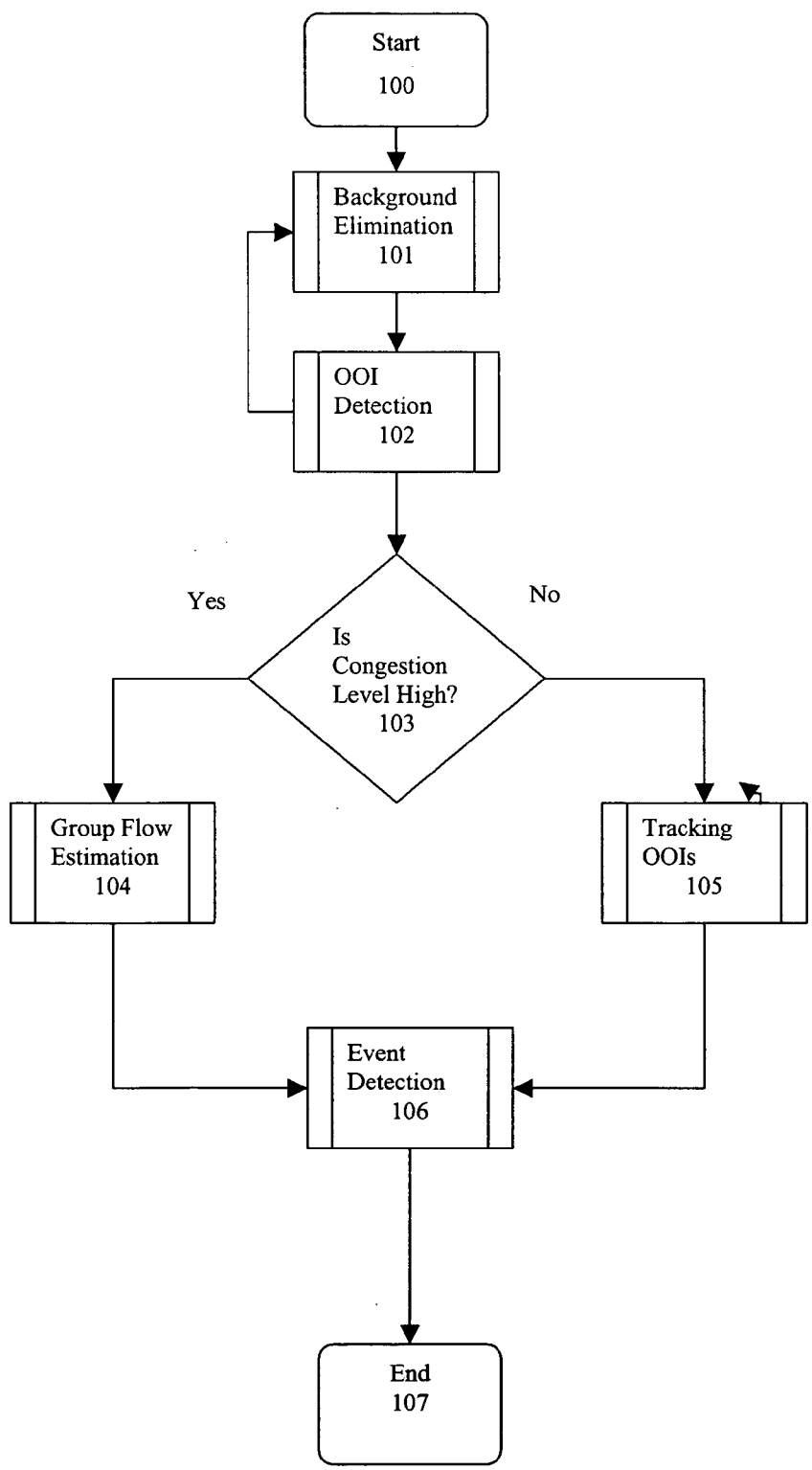
FIG. 1 is a flow diagram illustrating a method for event detection, in accordance with embodiments of the invention.

The system consists of several parts as shown in FIG. 1. The first component after the initialization part 100 is background elimination part 101. After the initialization process to obtain a background model of the scene, this model is updated afterwards to adapt to changes in the scene due to view (e.g., lighting) or object (e.g., addition of new objects or change of location of background objects) based changes or camera movements. Then the extracted regions of foreground objects are analyzed to detect the presence of objects of interest (OOIs) and to estimate the congestion level in the scene (block 102). The congestion level along with estimated occlusion and resolution levels are used to select the appropriate tracking algorithm (block 103). The output of the flow estimation (104) and tracking (105) algorithms provides motion analysis for event detection (106). Some of the events that may be detected are listed below in the given examples although other events may be defined by the end user as the motion analysis can be trained for different patterns.

Background Elimination

This part (101) of an embodiment of the invention relates to background elimination methods in videos. The method is based on developing high level semantics to differentiate temporary and permanent changes in the scene. Furthermore, the feedback from high level semantics is used to adapt the background model statistics.

Different approaches exist today for background elimination process. Two main categories are based on differentiating consecutive frames and comparing the current frame with a background model of the scene. Embodiments if the invention use the latter method.

In "Using adaptive tracking to classify and monitor activities in a site," by Grimson et al. in CVPR 1998 and "Learning patterns of activity using real-time tracking," by Grimson et al. in the IEEE Transactions on PAMI, Vol 22, No 8, 2000, the authors use a mixture of Gaussians to model the probability that an observed pixel has intensity value v at time t. The summation of the Gaussian probabilities is weighted where a weight is assigned to each distribution of the corresponding pixel's mixture model. The weights are updated by using exponential moving average. Furthermore, mean and variance of the distributions are updated for the matched distribution using exponential moving average.

in U.S. Patent Application Pub. No 2003/0053659, a system is defined to monitor a moving object in search area and detect threatening object paths. As stated by the inventors, the foreground object extraction is similar to Grimson's method cited above where each pixel has a multi-normal representation. The method is modified as the background changes as on and off with high frequency (e.g., clouds passing) are not adequate in Grimson's method. For this purpose, the inventors modify the computation of weights of the Gaussian probabilities in case a pixel is matched to an existing distribution and in case a pixel is not matched to any existing distribution.

However, embodiments of the invention relate to a different approach that enables obtaining high level semantics about temporal changes of the scene. The existing methods with one weight associated with each distribution can not differentiate the pattern of scene changes, e.g., repetitive changes with different levels of periodicity and randomness and changes that remain for long periods of time. This information is especially important for intelligent surveillance applications that monitor areas for long time periods. Furthermore, this approach enables a system to incorporate the moving camera parameters into the background changes easier.

Different color models as described in "Computer Vision: A Modern Approach," by D. A. Forsyth and J. Ponce, published by Pearson Education in 2003 and "Color Appearance Models," by Mark D. Fairchild, published by Addison-Wesley in 1998, may be used for a background elimination process. According to an embodiment of the present invention, HSV and YUV/YIQ color models may be used separately, or in combination. One having ordinary skill in the art will appreciate that other suitable models may be used. YUV (or YIQ) is a color model that has one luminance (Y) and two chrominance components (U and V). YUV is a color model appropriate to color TV and also a good representation for compression of chrominance information since the human eye is less sensitive to chrominance than luminance. The YUV space is used for the PAL broadcast television system used in Europe. The YIQ color space is used for the NTSC broadcast standard in North America. HSV is a color model represented with hue, saturation and value. Value represents lightness or brightness. Saturation determines the saturation of color and is the radius of cone. Hue determines the frequency of wave light (wavelength), value from 0 to 360 order angle. Value determines the level of white light, value form 0 to 1 and is height of the cone. Saturation is the richness of the color. Colors near the central axis have low saturation while colors near the surface of the cone have high saturation. The hue value is between 0 to 360 degrees with red at 0 (Red has coordinates H=0 degrees, V=1.0; S=1.0). When Saturation is set to 0, Hue is undetermined and the Value-axis represents the gray-scale image. The most common quantization of HSV is in 162 (18×3×3) bins.

The background may be changed because of different reasons. It may be due to environment changes, e.g., lighting and changes in the objects, e.g., clouds, new permanent objects. In terms of temporal characteristics, these can be classified as repetitive and constant changes. For instance, movement of tree branches and clouds cause pixels/blocks having different background models to change in a repetitive way. In areas affected by tree branches, the repetition duration in these areas are different than the sky areas affected by the passing clouds. Parked cars change the background model during a time interval where the change is constant. Lighting can change in a repetitive way for long time of periods, e.g., day vs. night or suddenly in a random way, e.g., turning on electricity, shadows due to new objects etc.

One drawback of the existing algorithms is that it is not easy to determine the temporal model for background elimination in terms of absolute times. An objective of embodiments of the invention is to model a change in the background scene by classifying the change according to the duration the change occurs and the temporal characteristics of the change. For this purpose, two time parameters can be used: duration and forgetting factor. Duration determines the number of frames the pixel/block is assigned to a background model. Forgetting factor determines the last time the pixel/block is assigned to a background model. In repetitive models, the duration of two background models are similar while the forgetting factor varies repetitively for these two models. In relatively constant changes, the duration gets longer and forgetting factor small for the new background model while the forgetting factor of other background models for the corresponding area gets larger and the duration remains constant. Note that the same parameters are used for foreground object models. Furthermore, these parameters enable the end user to control the foreground object extraction models. For example, in one application, the objective may be to classify parked cars as foreground objects to gather information such as parking time while in another application cars parked along a route may be considered as background objects.

Figure 2:
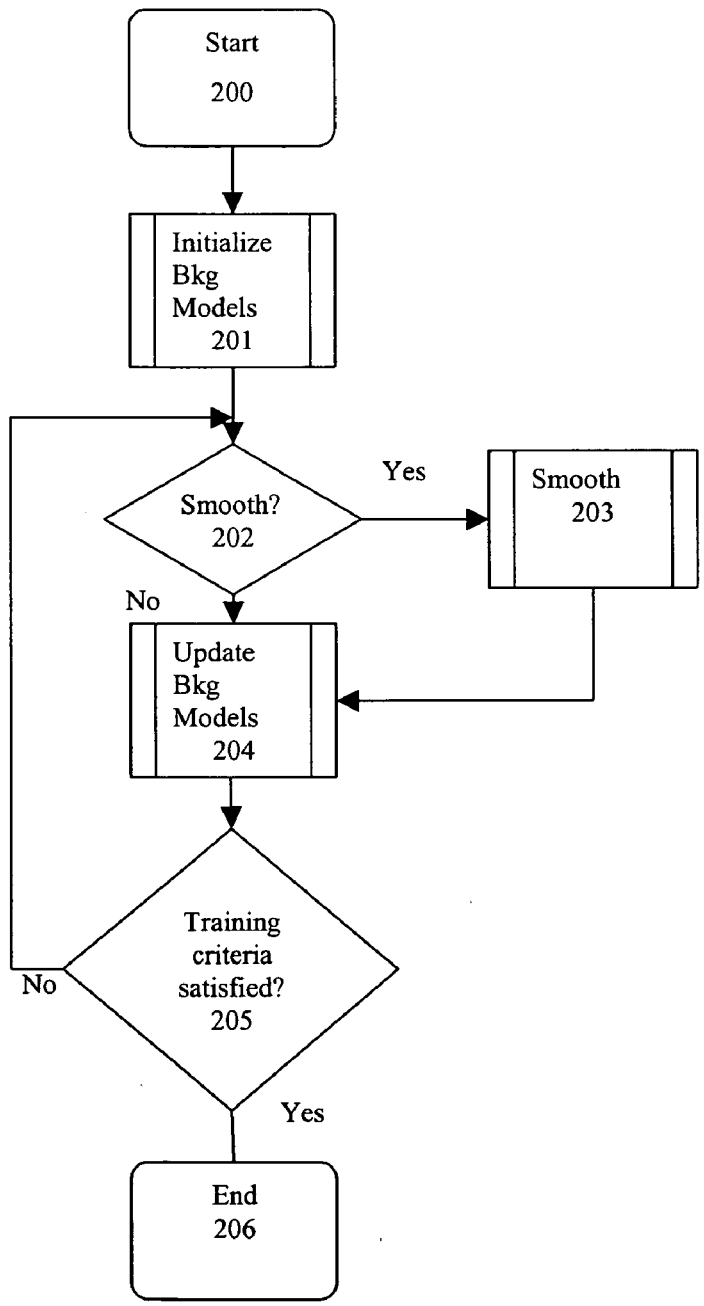
FIG. 2 is a flow diagram illustrating a method for initialization of a background model, in accordance with embodiments of the invention.

During the initialization phase, the background model statistics are computed (FIG. 2). The statistics of the background models consist of the mean and covariance of the model components and the duration of the background model (i.e. the number of frames where the pixel/block is assigned to the corresponding background model). Furthermore the forgetting factor is computed and its variance is observed. First, the parameters are initialized in step 201. The images may be smoothed to reduce the effect of background noise (block 203) if the smoothing option is selected (block 202). For every frame in the initialization phase, the parameters of the background model are updated (block 204). The initialization phase last until the training condition criteria are satisfied (block 205). The criteria may be based on the variance of the distribution with the highest duration during the training period. During the initialization phase, different classification methods (e.g., K-means algorithm) can be applied.

Note that during the initial training part, object detection and tracking are not performed. The training part of the background modeling enables learning the scene to improve the reliability and robustness of detection and tracking algorithms. The objective is to eliminate any static foreground object. The adaptation phase will continue to distinguish temporary and permanent changes in the scene.

The duration and forgetting factor are the temporal statistics used to obtain high level semantics about the changes in the background model as described above.

During the training phase, some foreground objects may be static for some time. If the object is static for a long duration during the training phase, it is assumed as a background object. Therefore, the training duration defines the criteria to distinguish temporary and permanent objects. For example, if a surveillance camera is deployed at a traffic light, at the initialization a car stopping in red light will not be a background object while a car parked next to road will be a part of the background. Note also that this classification will continue during adaptation phase. Furthermore, detection of objects of interest may be used to distinguish foreground objects.

Figure 3:
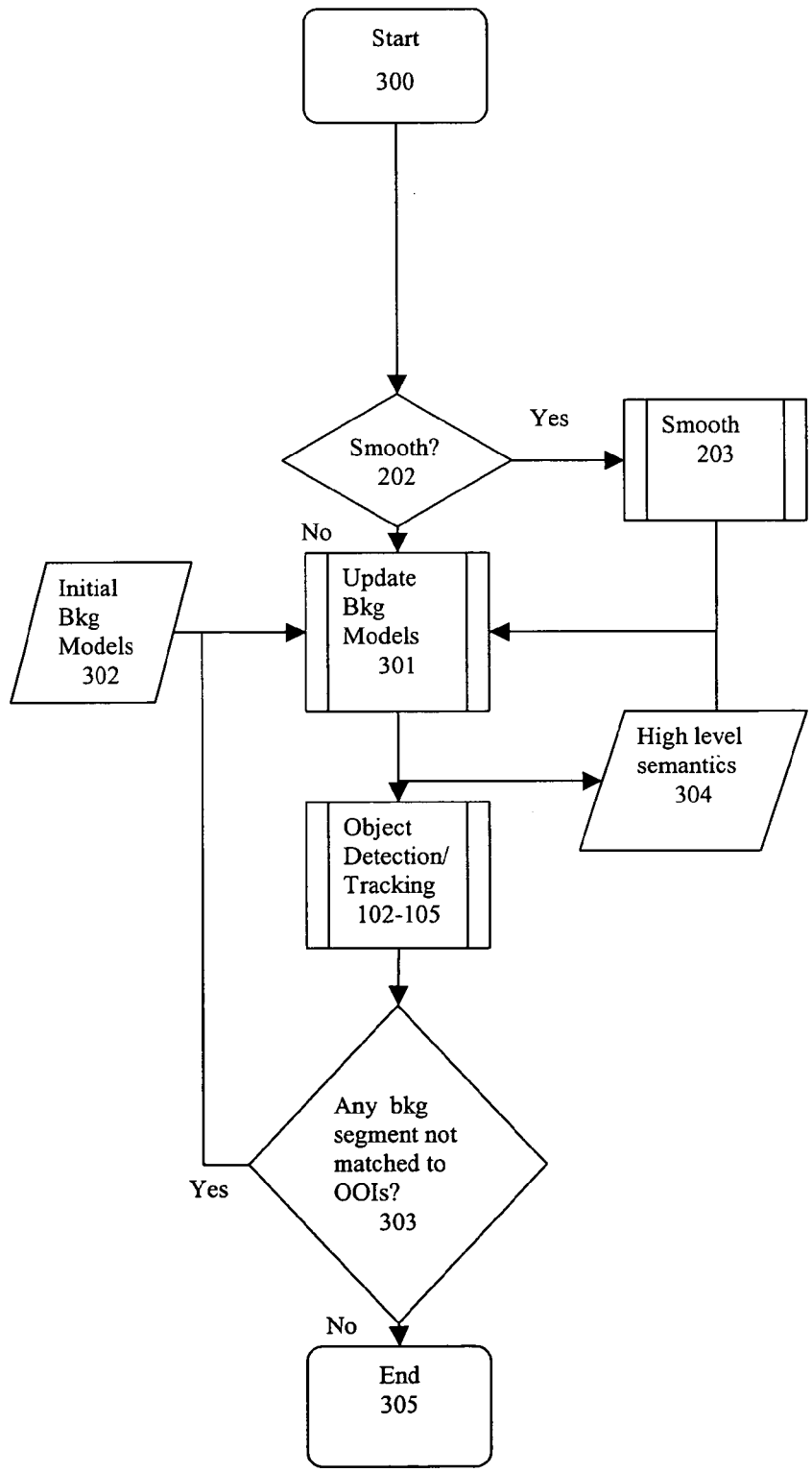
FIG. 3 is a flow diagram illustrating a method for updating of a background model, in accordance with embodiments of the invention.

After the training, the initial background model (block 302) is adapted to changes (FIG. 3). If the training phase smoothes the frame before processing, the same smoothing process (block 203) is applied afterwards. The background model is updating by taking exponential moving average with forgetting factor (block 301). If the forgetting factor is large, the new update is dominant. Otherwise, the average part is dominant. Each pixel's color components are compared with each distributions statistics. If the pixel matches to one of the distributions, the mean, covariance of the distribution, the duration and the forgetting factor values are updated. Otherwise, a new foreground distribution is created. If the new foreground object is a permanent change of the background, the area is then considered as background. The decision may be based on the duration and forgetting factors to understand if this is a repetitive change due to view based or object based changes. Note that the duration parameter can be normalized according to a predetermined period of time that may be computed based on the reappearances of the background changes. The results of object detection and tracking (blocks 102-105) are used to correct the background model if there are segments labeled as foreground that do not match to the OOI model (block 303). Due to several factors such as shadows, background errors etc., a segment next to the object of interest may be misclassified as foreground region. If this segment is not classified as a part of the object of interest in the object detection step (102), the feedback is used to classify the segment as a background object. This feature helps to improve cases such shadow removal. It is the objective of this system to have a flexible model for background-foreground classification. For instance, a surveillance system at a railway station may aim to monitor only people while everything else is considered as background. For this purpose a feedback from the object detection algorithm may be used to classify other objects in the scene as background objects.

Most of the background models are pixel based where connected components are applied afterwards to form possible foreground objects. Using feedback from foreground object detection to reclassify the background pixels helps also to overcome miss classification in several cases, e.g., person walking towards an area with background color similar to human clothing. Furthermore, high level semantics of the background model are computed (block 304) and are used as a feedback to the update process.

The algorithm uses a maximum number of distributions that a pixel/block may have. This number is controlled by the comparison criterion to assign a pixel/block to a background model. For example if the criterion is based on the mean of the luminance component which is between 0 and 255 and if the threshold is 64 then this value is 4 at most. If the maximum number of distributions has a hard limit, the background model with highest forgetting factor and least duration may be overwritten. The forgetting factor is updated by setting the last time the pixel/block is assigned to the corresponding background model to the current frame number.

Detection of OOIs and Estimation of Congestion Level

Figure 4:
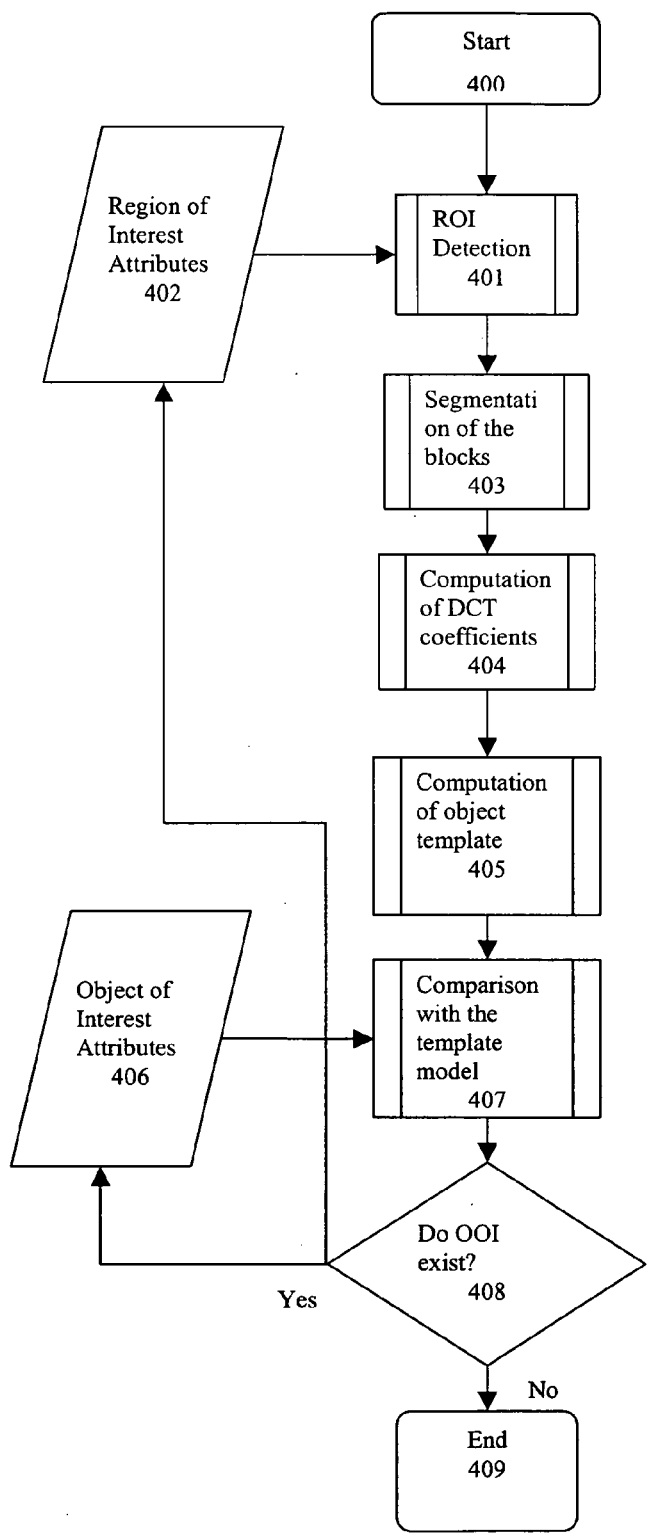
FIG. 4 is a flow diagram illustrating a method for object detection for low resolution and high occlusion levels, in accordance with embodiments of the invention.

This part (102) of embodiments of the invention relates to methods of finding the presence of OOIs. The approach is suitable to detect OOIs such as human in crowded environments with high occlusion and low resolution levels. A possible application is to detect people in congested areas in order to detect congestion level. Unlike the other object detection schemes color, shape and motion can not be used reliably in these images due to the low resolution and high occlusion levels. Therefore, a more abstract presentation based on DCT coefficients is used for detection (FIG. 4).

The background elimination algorithm defined above is used with high level knowledge of the scene to extract regions of interest (ROI) (401) where the motion analysis is done. The high level knowledge (402) may be introduced by the user as a masking process or by performing a priori training to detect predetermined OOIs in a scene. The latter is done automatically to label the regions by using similar scenes. For example, monitoring areas in a train station may consist of platform and railway areas. The object detection may be done only in the predefined regions of interest. Different events are then defined according to the object detection results in different regions of interest.

Then these regions of interest are divided to blocks (403) to apply object detection algorithm. The block size in the images to search for OOI depends on the location relative to the camera. For this purpose, conventional camera calibration methods can be used. In the simplest form, a number (n) of block sizes may used by dividing the frame into n regions in y direction.

For each block slided in both directions, DCT coefficients are computed (404). Since in low resolution image areas, color components are in general not reliable, only the DCT coefficients of luminance values may be used. If the saturation level is high (e.g., S>threshold in HSV color model), DCT coefficients of color components also may be used.

Then a template (405) of OOI based on the DCT coefficients is created to compare (407) with the model template (406). An option for this template is to use DCT coefficients in smaller blocks of the original block. For example, the head areas form, high AC values in the borders of a circular area. Another option is to create eigenimages based on the DCT values. A weighted summation of the first m AC coefficients may be used for this purpose. The eigenimages create silhouettes of OOIs. For example, silhouettes of peoples' head-shoulder areas may be used for this purpose. The model template for the silhouette can be created by training for the occluded silhouettes. Principal component analysis may then be used to compare the model template with the computed silhouette.

Instead of DCT coefficients, wavelet parameters (or similar compression methods), may also be used for detecting occluded OOIs.

The output of this part enables estimation of congestion level in the scene. Depending on the congestion level in the scene (or parts of the scene), group or individual motion analysis are performed. Different applications may be implemented afterwards. For example, flow estimation algorithm described in the next section may be used together to give an alarm if the standing person number per area exceeds a threshold.

To compute the congestion level, in each block, the areas where OOI is detected are marked as 1. If the ratio of areas marked as 1 to the total areas is greater than a predetermined threshold, it is assumed that the area is congested and the level of congestion per area is computed. Note that the block sizes are adapted according to camera calibration results.

To increase the reliability of the detection process, the same algorithm is applied over N frames and the average of the results is used for the blocks. The number N of frames depends on the flow estimation results. If the flow estimation shows high mobility and change in the blocks then a small number is chosen for N, otherwise a large number is used to increase the detection reliability. The results are used to update the ROI (402) and OOI (406) attributes. For example, if the OOI eigenimage is computed with small variance for a large N, it is included in the template model.

Flow Estimation of the OOI Groups

Figure 5:
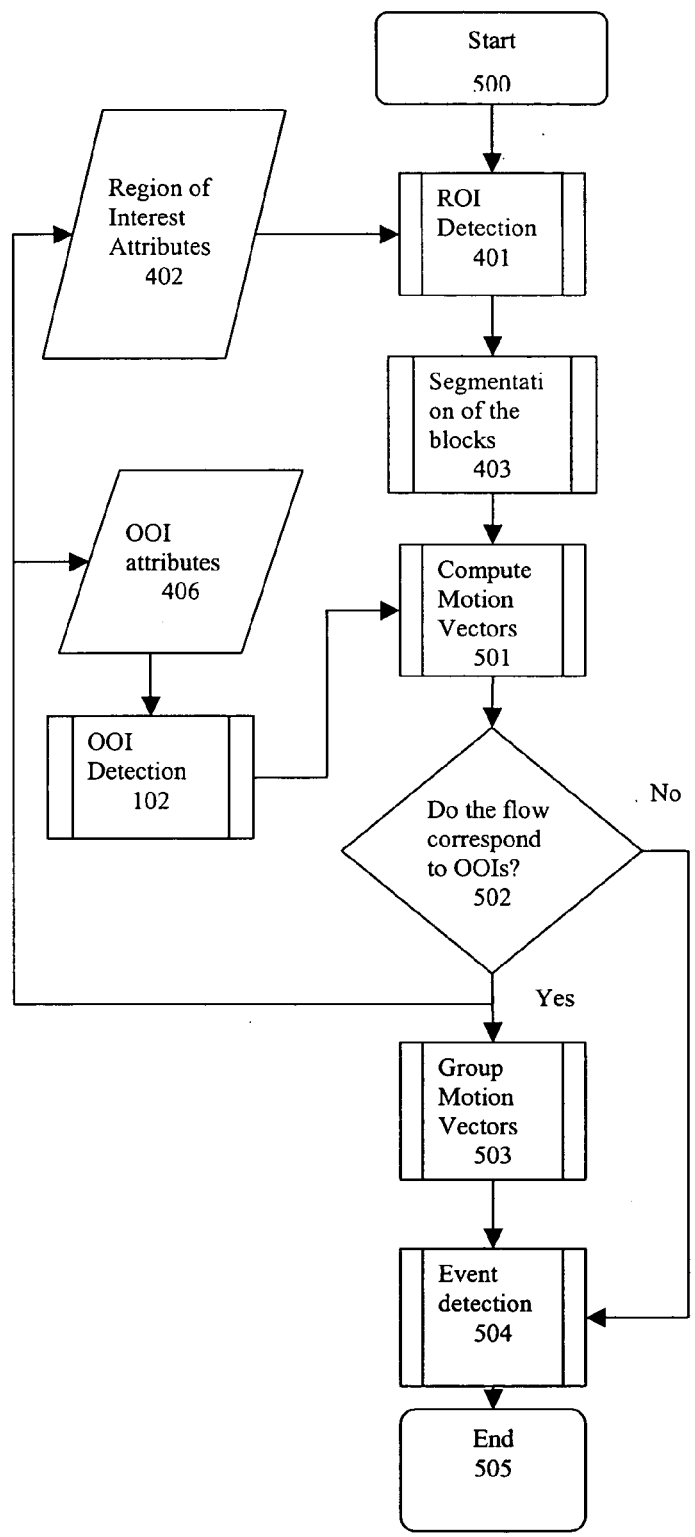
FIG. 5 is a flow diagram illustrating a method for flow estimation of object of interest (OOI) groups, in accordance with embodiments of the invention.

With reference to FIG. 5, and continued reference to FIG. 1, this part (104) of embodiments of the invention relates to methods of estimating the flow of OOIs. It is the objective of embodiments of the invention to use simple and fast algorithms to compute low-level motion features while using a robust and reliable way to connect them to high-level attributes such as average crowd movement estimation. This algorithm is used with object detection algorithm in order to connect the motion features to detected OOIs. OOIs can be non-rigid objects (e.g., human, animals) and rigid objects (e.g., cars, trains). The outcome of this algorithm may be used for estimation of crowd flow. Possible applications include flow estimation for group of peoples, animals, cars etc.

Different algorithms can be used to compute low-level motion features (501), e.g., Kanade-Lucas tracking algorithm for the blocks selected in the previous section. The output of this algorithm provide motion vectors in x and y direction. If the magnitude of the motion vectors is greater than a predetermined threshold, the direction (e.g., 4 or 8 directions) for each pixel in the group is determined. Then the overall direction and magnitude are computed by using pixel based direction and magnitude values (503). Different statistics may be used for motion attributes, e.g., mean and variance values. The variance in a block may be due to different motions of OOIs in a block area or different motions of parts of OOI in this block. To differentiate these two cases and to make the motion analysis more reliable, the motion groups and OOI regions detected in the previous section are mapped in order to connect the low level motion parameters to high level semantics, e.g., movement of a particular OOI. For this, the areas that are labeled as OOI are compared to areas marked as 1 for a particular motion vector.

To increase the reliability of the flow estimation, the motion of the block is tracked over M frames and the average motion is computed. M depends on the motion parameters such as the variance in the direction of individual pixels in the block and of the overall block. The parameters are reset at every M frames. M may be chosen per block or based on the highest mobility in the scene.

The motion vectors are also used to characterize ROIs (402) and OOIs (406) attributes. For instance, motion vectors on a railway area correspond to high velocity areas with motion vectors well directed to the same direction. This is used to detect trains (that come, stop and go) along with other attributes such as shape related features as defined in the previous section.

The event detection (504) is used by using the outputs of object detection and flow estimation algorithms. For example, for the railway stations, the ROI is the platform and railway areas while OOIs are people and trains. The grouped motion vectors in the blocks may be processed if the magnitude exceeds a certain threshold. In one example, the standing-moving person percentage is computed and displayed. If the standing person number per area exceeds a threshold an alarm is given.

Tracking

Figure 6:
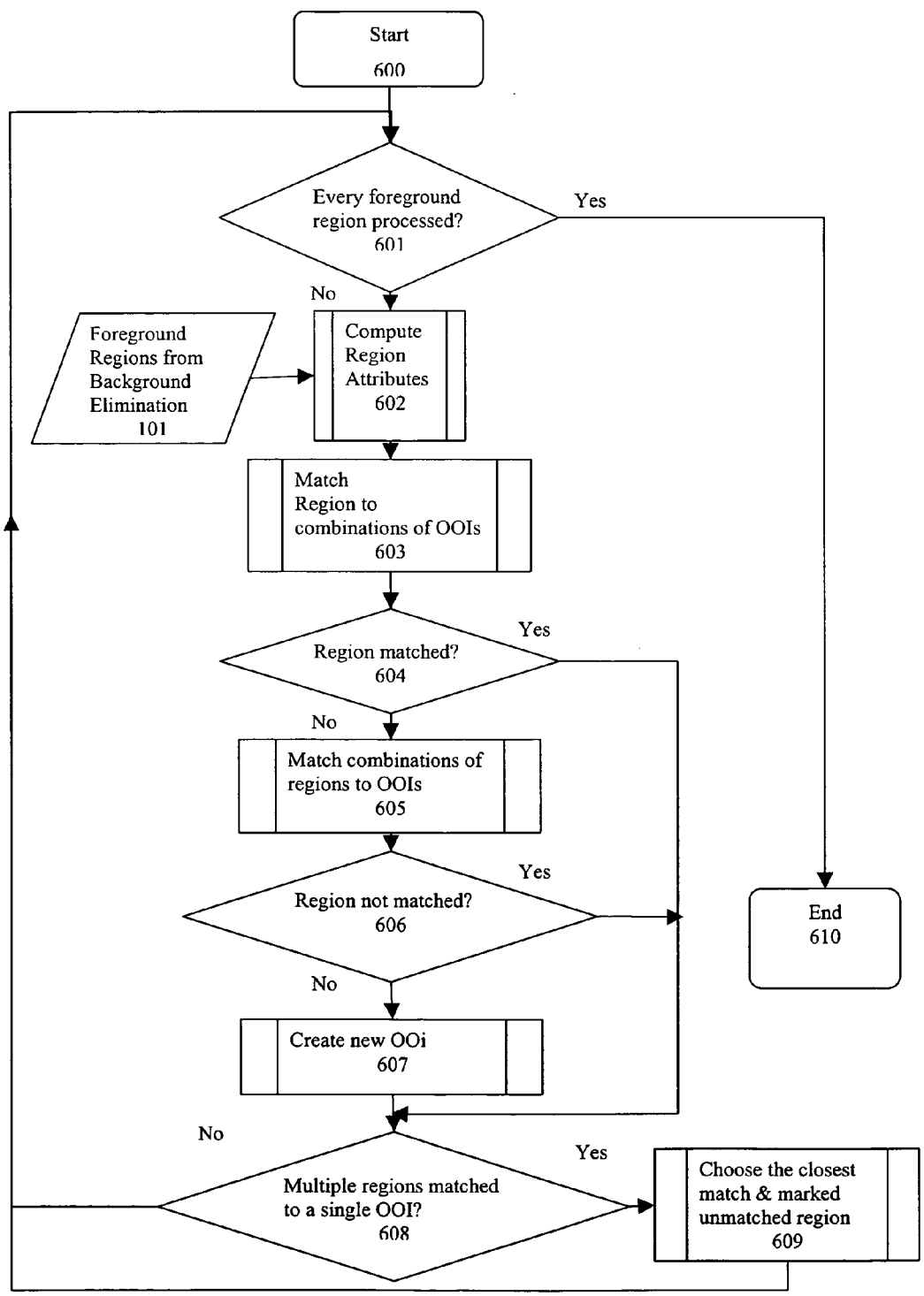
FIG. 6 is a flow diagram illustrating a method for tracking, in accordance with embodiments of the invention It is to be understood that the attached drawings are for purposes of illustrating the concepts of the invention.

With reference to FIG. 6, and continued reference to FIG. 1, this part (105) of embodiments of the invention relates to methods of tracking individual OOIs in order to make motion analysis, e.g., behavior of individual people. The tracking algorithm in this part is based on shape, color and motion patterns of object of interests (OOI). The aim is to use simple and fast algorithms to match low-level image features of segments in different frames while using a sophisticated algorithm to combine/segment the regions to connect them to high-level attributes of the OOIs. Low-level features can be pixel colors, motion vectors of regions in a frame while high-level attributes are labels assigned to this region (e.g. region that corresponds to head-torso area of a person moving towards camera). OOIs can be non-rigid objects (e.g., human, animals) and rigid objects (e.g., cars, trains). The outcome of this algorithm may be used for motion analysis including articulated movements, gestures, rigid movements for event classification. It is the objective of this invention to provide robust and reliable tracking of OOIs even in the case of occlusion and view changes.

The foreground regions are obtained from background elimination algorithm (101) as the connected components of pixels that are marked as foreground. A region may be a combination of different foreground segments.

Each region has the following structure (to form attributes in step 602).

If the contour points of the regions are used:
Number: number of contour points of this region
X: x coordinates of contour points of this region
Y: x coordinates of contour points of this region
M_color[i]: Mean of the $i^{th}$ component of the color model in this region (e.g., if HSV color model is used, hue, saturation and value components are computed). In some embodiments, other statistics may be included.
CV_color[i]: Covariance of the $i^{th}$ component of the color model in this region (e.g., if HSV color model is used, hue, saturation and value components are computed)
Blacklist_num: The number of OOI regions that should not be matched to this region. Blacklist attributes may be set as OOI region's attributes depending on the implementation.
Blacklist: An array to maintain the ids of OOI regions that should not be matched to this region.
Difference: A temporary value to keep the difference if attributes between this region and OOI regions that are being tracked. In some embodiments, this value may be replaced, depending on the implementation.

If the all points in the regions are used:
Number: number of points in this region
X: x coordinates of points in this region
Y: x coordinates of points in this region
M_color[i]: Mean of the $i^{th}$ component of the color model in this region (e.g., if HSV color model is used, hue, saturation and value components are computed)
CV_color[i]: Covariance of the $i^{th}$ component of the color model in this region (e.g., if HSV color model is used, hue, saturation and value components are computed)
Blacklist_num: The number of people regions that should not be matched to this region.
Blacklist: An array to maintain the ids of people regions that should not be matched to this region.
Difference: A temporary value to keep the difference if attributes between this region and people regions that are being tracked.

One having ordinary skill in the art will appreciate that other attributes, such as, for example, texture pattern and/or subregions with skin color, may be added in the attribute list.

The attributes for each foreground region (601) are computed in step 602. The input arguments are Number, X, Y and the color values of the points in the frame. The color component statistics (e.g., mean and variance) are computed for different blocks of the region. This helps to distinguish different parts of OOI and track the parts of OOI in case of occlusion.

Each OOI region that is being tracked has the following attributes:
Mean_X: Mean of X coordinates of points in the OOI region
Mean_Y: Mean of Y coordinates of points in the OOI region
Max_X: Maximum X coordinate of points in the OOI region
Min_X: Minimum X coordinate of points in the OOI region
Max_Y: Maximum Y coordinate of points in the OOI region
Min_Y: Minimum Y coordinate of points in the OOI region
Major_X: Major axis of X coordinate of points in the OOI region
Major_Y: Major axis of Y coordinate of points in the OOI region FirstFrame: The first frame this OOI is detected. Depending on the implementation (e.g. interrupt priorities, speed constraints etc.) and computer processing power, not all the frames are processed for tracking. Some of the frames may be skipped. It is important to keep the frame numbers separately for all the frames and for the frames that are processed. The attributes for the OOI can be based on the numbers of the processed frames.

LastFrame: The last frame this OOI is detected.

Combined_flag: Flag indicated if the OOI is detected as single object in the current frame or as occluded by another object.

M_color[i]: Mean of the $i^{th}$ component of the color model in a window. (Color attributes in different windowed areas of OOI) (e.g., if HSV color model is used, hue, saturation and value components are computed)

CV_color[i]: Covariance of the $i^{th}$ component of the color model in a window area (e.g., if HSV color model is used, hue, saturation and value components are computed)

MatchedRegion: The id of the foreground region matched to this OOI.

Dx: The distance between the Mean_X of this OOI in the current frame and the previous frame it was detected.

Dy: The distance between the Mean_Y of this OOI in the current frame and the previous frame it was detected.

Dv: The velocity of the OOI's movement computed from Dx and Dy. The velocity should be normalized according to the difference between the current frame and the last processed frame for this OOI Furthermore, the following attributes are kept when a single OOI is matched to a single region or a combinations of regions to reduce the error when objects are occluded (the use of these attributes depend on the OOI since the objects attributes change in time as the view angle and/or their motion change):

Single_Mean_X: Mean of X coordinates of points in the OOI region

Single_Mean_Y: Mean of Y coordinates of points in the OOI region

Single_Major_X: Major axis of X coordinate of points in the OOI region

Single_Major_X: Major axis of Y coordinate of points in the OOI region

Single_LastFrame: The last frame this OOI is detected.

Single_M_color[i]: Mean of the $i^{th}$ component of the color model in this region (e.g., if HSV color model is used, hue, saturation and value components are computed)

Single_CV_color[i]: Covariance of the $i^{th}$ component of the color model in this region (e.g., if HSV color model is used, hue, saturation and value components are computed)

Other attributes such as texture pattern and/or subregions with skin color may be added in the list.

There are several options to remove OOIs from the active list. In one option, if the OOI is assumed to be out of the view of the monitoring area, it is no more maintained in the tracked objects table. The assumption is based on a threshold that describes the number of processed frames this OOI is not detected since its lastframe. Furthermore, a high level knowledge of the scene will be used for this purpose (e.g., estimating the enter/exit areas of the scene by using the firstframe and lastframe locations of detected OOIs). However, the list may keep the OOI's information even when object is out of the view area for two cases: 1) when the same OOI is assumed to enter/exit the area of view (e.g., when people id's are kept based on face recognition or other identity based recognition algorithms when high resolution of frames are available). 2) when coordination of multiple cameras are implemented where an OOI exits the view area of a camera and enters that of another neighbor camera. Embodiments of the invention may be used when multiple cameras are used for surveillance. Existing algorithms may be used for image fusion from multiple cameras. In this case, a central processor applies an embodiment of the invention for the frames obtained from multiple cameras. Another option is to use distributed system where each camera processes its area of view and then sends the tracking data to the candidate cameras based on the location information. Optionally, each OOI's attributes are saved with the corresponding frame number.

The inputs for matching block 603 are foreground segments in the current frame and OOIs detected in the previous frames. There are region_number of individual and combined foreground regions (REG) to be processed. The example algorithm described herein uses an outer loop for regions and may match the same OOI that is being tracked to multiple regions. Therefore, region_number may be increased if a region is previously mismatched to an OOI in order to match this region to another OOI.

The following transitions may occur for an OOI;
1. single OOI matched to a region->occluded OOI matched to a region with other OOIs:
2. occluded OOI matched to a region with other OOIs->single OOI matched to a region.

The second option may result in matching two OOIs as one OOI initially depending on the occlusion level and available resolution if the OOIs were never detected as single OOIs in the previous frames.

The matching algorithm matches a region denoted by REG (an individual foreground segment or combined foreground segments) to an individual or combined OOIs. An example algorithm flow is given below (for blocks 603-605) in order to clarify the matching process. Similar algorithms may be used to collect high-level attributes of the OOIs in order to match the new segments in the scene for tracking purposes.

| Match REG to OOIs |
|---|
| FOR each OOI in the tracking table<br>    IF OOI is not in REG.Blacklist &current_frame-OOI.Lastframe < last_frame_thres<br>        IF difference(OOI.Mean and REG.Mean) (this may be difference of mean_x and mean_y values) < dif_mean<br>            Put OOI in the combination_list<br>        ENDIF<br>    ENDIF<br>ENDFOR<br>IF combination_list is not empty<br>    Find the combinations of OOIs in the combination_list (The combinations are |

-continued

Match REG to OOIs found for each OOI in the combination list. For example, if the OOIs in this list are 2,3,6 then possible combinations that are the entries of the combination list are: 2; 3; 6; 2-3; 2-6; 3-6; 2-3-6).
    ENDIF
    Set DIF to a large number
    FOR each entry in the combination_list
        Set Comb_Max_X &Comb_Max_Y to 0
        Set Comb_Min_X &Comb_Min_Y to a large number
        FOR each OOI in the entry
            IF OOI_Max_X $\geq$ Comb_Max_X
                Comb_Max_X=OOI_Max_X
            ENDIF
            IF OOI_Max_Y $\geq$ Comb_Max_Y
                Comb_Max_Y=OOI_Max_Y
            ENDIF
            IF OOI_Min_X $\leq$ Comb_Min_X
                Comb_Min_X=OOI_Min_X
            ENDIF
            IF OOI_Min_Y $\leq$ Comb_Min_Y
                Comb_Min_Y=OOI_Min_Y
            ENDIF
        ENDFOR
        Comb_Mean_X=(Comb_Max_X+Comb_Min_X)/2;
        Comb_Mean_X=(Comb_Max_Y+Comb_Min_Y)/2;
        IF the difference between combined OOIs and REG $\leq$ DIF+STD_DIF (STD_DIF
is added to be able to select combined OOIs rather then single OOI in case occlusion occurs (as OOIs approach to each other)).
            DIF = difference between comb_OOIs and REG
            SET MIN_DIF_IND as the index of the entry in the combination_list
        ENDIF
    ENDFOR
    IF Combined_search_option is enabled (this part is added as a control to check if any OOI close to the region is missed. This may be due to the fact that some frames may be skipped without processing and comparison of differences to thresholds values may exclude some OOIs).
        FOR every OOI not in the entry MIN_DIF_IND in the combination list
            IF OOI is not in REG.Blacklist &current_frame-OOI.lastframe <
                last_frame_thres
                IF OOI.Mean points are inside REG &borders of the OOI
are close to those of REG
(the comparison is made by computing the difference between the OOI's and region's Max and Min points in X and Y coordinates).
                Add OOI into the entry MIN_DIF_IND to form Comb_OOI
                ENDIF
            ENDIF
        ENDFOR
    ENDIF
    FOR each area in the entry in the LOCATION_TABLE of REG = REG_Window
(LOCATION_TABLE is described below)
        Set color_dif to a large number
        FOR each OOI in the Comb_OOI
            Set window_number to 0
            FOR each windowed area in the OOI=OOI_Window
                IF
difference(OOI_Window.Mean,REG_Window_Mean)<DIF_Window
                    Compute color components statistics as
OOI_Window.color (other feature diferences (shape, texture) may be also computed).
    Tot_dif=Tot_dif+diff(OOI_Window.color,REG_Window.color)
                    Increase window_number by 1
                ENDIF
            ENDFOR
            Tot_dif=Tot_dif/window_number
            IF Tot_dif<color_dif
                color_dif= Tot_dif
                matched_location_entry = entry in the LOCATION_TABLE
            ENDIF
        ENDFOR
    ENDFOR
    FOR each OOI in the Comb_OOI
        IF OOI is a matched location_entry
            Update OOI.Min_X;Max_X;Min_Y,Max_Y attributes
        ELSE (if the OOI is severely occluded, this condition may occur)
            Estimate OOI. .Min_X;Max_X;Min_Y,Max_Y (the severe occlusion case
where OOIs location is estimated is explained below).
        ENDIF
    ENDFOR When the combinations are taken without any constraint among them, some combinations may not be meaningful. Like taking two regions that have another region between them but the intermediate is not taken. Combined search option is included to take into account the miss of small regions between combined regions.

LOCATION_TABLE defines the location of an individual OOI in the REG. An OOI may be at the most left of the region (MIN_X) and/or at the most right of the region (MAX_X) and/or at the bottom of the region (MIN_Y) and/or at the top of the region (MAX_Y) and/or inside the region. When OOIs are occluded with other OOIs or background objects, the location of the OOI is found by using color, shape, motion attributes and constraints (such as displacement constraints) based on different windowed areas on the OOI. For instance different windowed areas on the OOI are matched based on color components to the REG. If a part of the OOI is occluded, some windowed areas will not be matched but other areas will match depending on the occlusion level (as opposed to algorithms that only address mean shift of the objects).

If OOI is not matched to any region (606), a new OOI is created (607) for the corresponding REG as the following:

| SET new OOIs attributes |
| --- |
| OOI.Max_X=REG.Max_X |
| OOI.Min_X=REG.Min_X |
| OOI.Max_Y=REG.Max_Y |
| OOI.Min_Y= REG.Min_Y |
| OOI.Major_X=OOI.Max_X-OOI.Min_X; |
| OOI_Major_Y=OOI.Max_Y-OOI.Min_Y; |
| OOI_Mean_X=REG_Mean_X; |
| OOI_Mean_Y=REG_mean_Y; |
| OOI_Lastframe=this frame; |
| OOI_Firstframe=this frame; |
| OOI_Matchedregion=REG; |
| OOI.Combined_flag=0 |
| OOI.M_color[i]= REG.M_Color[i] |
| OOI.CV_color[i]= REG.CV_Color[i] |
| OOI.Dx=0 |
| OOI.Dy=0 |
| OOI.Dv=0 |
| OOI.Single_Mean_X=OOI.Mean_X |
| OOI.Single_Mean_Y=OOI.Mean_Y |
| OOI.Single_Major_X=OOI.Major_X |
| OOI.Single_Major_X= OOI.Major_X |
| OOI.Single_LastFrame= OOI.LastFrame |
| OOI.Single_M_color[i]= OOI.M_color[i] |
| OOI.Single_CV_color[i]= OOI.CV_color[i] |

If one OOI is matched to more than one region (608), the following subroutine (609) is performed:

| Find the closest REG to be matched to the OOI |
| --- |
| REG1.Difference = w1 * Motion_Dif +w2 * Color_Dif + w3 * Shape_Dif |
| IF REG1.Difference for this OOI < REG2.Difference for this OOI |
|     Update OOI attributes for REG1 |
|     Put OOI in the REG2.Blacklist |
|     Match REG2 again |
| ENDIF |

As the matching process takes into account color, shape and motion differences between OOIs in the active list and the new segments in the current frame, the effect of occlusion is reduced. The motion estimation part computes the average motion of region parts matched to OOIs. Note that different motion estimation algorithms can be used to match the regions in the current frame with regions corresponding OOIs in the previous frames by using low-level features, as described above. This part addresses high-level matching of the regions that are found as combinations/fragmentations of segments matched by low-level features. Therefore, the following motion parameters correspond to the regions labeled as whole OOI or parts of OOI (e.g., limbs, torso for human).

| |
| --- |
| IF processed_frame_ind > frame_threshold |
|   SET alpha= f(OOI.Lastframe) (different alpha values is used to take into account that not all frames can be processed (due to the computer power limitations) and not every OOI is matched in every frame). |
|     tmp_Mean_X=OOI.Mean_X_previous_frame |
|     tmp_Mean_Y=OOI.Mean_Y_previous_frame |
|     OOI.Dx=alpha * OOI.Dx + (1-apha) * dif(OOI.Mean_X-tmp.Mean_X) |
|     OOI.Dy=alpha * OOI.Dy + (1-apha) * dif(OOI.Mean_Y-tmp.Mean_Y) |
|     OOI.Dv=alpha * OOI.Dv +(1-alpha) * sqrt(OOI.Dx^2+OOI.Dy^2)/(this frame-OOI.Lastframe) |
| ELSE |
|     OOI.Dx=0 |
|     OOI.Dy=0 |
|     OOI.Dv=0 |
| ENDIF |

The following subroutine is an example to remove stale information such as OOIs that left the scene. The OOIs are not removed from the list immediately as the matching may fail due to severe occlusion or other errors.

| Update OOI list |
| --- |
| IF current frame-OOI.Lastframe > frame_threshold1 & current frame-OOI.Lastframe ≦ frame_threshold2 |
|     IF OOI.Mean is close to an exit/enter area |
|         Remove OOI form the list |
|     ENDIF |
| ELSEIF current frame-OOI.Lastframe > frame_threshold2 |
|     Remove OOI form the list |
| ENDIF |

The algorithm should be optimized not to exceed a certain processing time per frame for a number OOIs. For complex scenes with high number of OOIs, some frames may be skipped due to the processing power limitations. This requires adaptation of the thresholds (especially location and motion differences) to the number of frames processed. For example, if two frames are skipped, the difference between the last location of the OOI and its new location would be higher.

In low resolution images (where the object sizes are small), the motion analysis is performed based on the whole body while in high resolution images it is based on the analysis of different object parts. The outcome of the latter described in this section may be used for different event detections. For example Dx and Dy values may be used to estimate the direction of OOI and its speed (e.g., walking vs running). Using the Major_X and Major_Y attributes along with the detected head area (that corresponds to MAX_Y part for a standing person) may help to detect fallen people. The motion analysis of rigid objects such as trains, cars are made similarly by comparing the OOI.Dx, OOI.Dy and OOI.Dv attributes.

Exemplary Apparatus According to an Embodiment of the Present Invention

Embodiments of the invention relate to an apparatus for object tracking and activity analysis in crowded environments comprising a means for eliminating the background and finding the foreground regions using color models in uncompressed and compressed domains based on: a) using high-level temporal semantics (e.g., statistics (i.e. mean, variance with confidence levels) of duration and repetition patterns corresponding to mixture of model distributions with different color models) for improved background model adaptation; b) using high-level scene semantics (e.g., statistics for object based versus view based scene changes) for improved background model adaptation; c) combining high-level temporal and scene semantics for analysis of the surveillance areas; and d) using temporal statistics to improve the robustness of initial background analysis without requiring the scene model without foreground objects.

The apparatus can further include a means for finding the object of interest in low resolution-high occlusion levels based on: a) extracting regions of interest that are divided to blocks based on the camera calibration and analysis of sizes of objects in the scene; b) computing the templates for low and high frequency components (e.g., using DCT) of the blocks; c) training to match the templates to the labeled templates (e.g., head-shoulder areas of group of peoples standing together); and d) comparing the input image templates to those of trained templates to find the presence of object of interest.

According to an embodiment of the present invention, the apparatus can include a means for selecting appropriate detection and tracking algorithms (e.g. group versus individual objects) based on the estimated congested and occlusion levels. In addition, the apparatus includes a means for tracking the group objects of interest in low resolution-high occlusion levels based on: a) corresponding the flow blocks to areas marked with possible objects of interests; b) using motion parameters such as the variance in the direction of individual pixels in the block and of the overall block and computing the confidence levels for group movements based on these statistics.

According to an embodiment of the present invention, the apparatus can include a means for analyzing the activity in low resolution-high occlusion levels based on: a) estimating the congestion level based on the method of finding the object of interest in low resolution-high occlusion levels; b) estimating the flow of a group of object of interest by using methods of optical flow computations; c) combining the results in a) and b) to find activities and events (e.g., tracking increasing congestion levels and differentiating areas with high congestion levels-low movement for events detections such as possible dangerous situations, automatic analysis of train/bus stations etc.)

Embodiments can also include a means for finding individual objects of interest and their activities based on: a) using weighted shape, color, motion patterns of image blocks and combining/segmenting the blocks to match templates of object of interest in order to overcome occlusion problems; b) changing the weights of patterns by using the confidence levels of each pattern based on the statistics such as variance/mean; c) keeping a list of object of interest detected in the scene to match to individual and/or a combination of foreground regions and to match the combination of detected objects of interest to foreground regions; d) using a, b and c to find activities such as walking/running/falling etc.; e) using the output of object detection to find high level semantics of the scene (e.g. finding the exit/enter areas of a scene) and using high-level semantics to improve the detection reliability (e.g. using exit/enter areas to understand the possibility if a object left the scene or is occluded); and f) using high level semantics to inform the neighboring cameras for tracking possible objects in order to provide a reliable distributed surveillance system.

Exemplary Method According to an Embodiment of the Present Invention

Embodiments of the present invention relate to methods for object tracking and activity analysis in crowded environments including the steps: 1. eliminating the background and finding the foreground regions using color models in uncompressed and compressed domains based on: a) using high-level temporal semantics (e.g. statistics (i.e. mean, variance with confidence levels) of duration and repetition patterns corresponding to mixture of model distributions with different color models) for improved background model adaptation, b) using high-level scene semantics (e.g. statistics for object based versus view based scene changes) for improved background model adaptation, c) combining high-level temporal and scene semantics for analysis of the surveillance areas, and d) using temporal statistics to improve the robustness of initial background analysis without requiring the scene model without foreground objects;

2) Finding the object of interest in low resolution-high occlusion levels based on: a) extracting regions of interest that are divided to blocks based on the camera calibration and analysis of sizes of objects in the scene, b) computing the templates for low and high frequency components (e.g., using DCT) of the blocks, c) training to match the templates to the labeled templates (e.g., head-shoulder areas of group of peoples standing together), and d) comparing the input image templates to those of trained templates to find the presence of object of interest.

3) Selecting appropriate detection and tracking algorithms (e.g., group versus individual objects) based on the estimated congested and occlusion levels;

4) tracking the group objects of interest in low resolution-high occlusion levels based on: a) corresponding the flow blocks to areas marked with possible objects of interest, and b) using motion parameters such as the variance in the direction of individual pixels in the block and of the overall block and computing the confidence levels for group movements based on these statistics.

5) Analyzing the activity in low resolution-high occlusion levels based on: a) estimating the congestion level based on the method of finding the object of interest in low resolution-high occlusion levels, b) estimating the flow of a group of object of interest by using methods of optical flow computations, c) combining the results in a) and b) to find activities and events (e.g., tracking increasing congestion levels and differentiating areas with high congestion levels-low movement for events detections such as possible dangerous situations, automatic analysis of train/bus stations etc.).

6) Finding individual objects of interest and their activities based on: a) using weighted shape, color, motion patterns of image blocks and combining/segmenting the blocks to match templates of object of interest in order to overcome occlusion problems, b) changing the weights of patterns by using the confidence levels of each pattern based on the statistics such as variance/mean, c) keeping a list of object of interest detected in the scene to match to individual and/or a combination of foreground regions and to match the combination of detected objects of interest to foreground regions, d) using a, b and c to find activities such as walking/running/falling etc., e) using the output of object detection to find high level semantics of the scene (e.g., finding the exit/enter areas of a scene) and using high-level semantics to improve the detection reliability (e.g., using exit/enter areas to understand the possibility if a object left the scene or is occluded), and f) using high level semantics to inform the neighboring cameras for tracking possible objects in order to provide a reliable distributed surveillance system.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A method for object tracking in a surveillance area, the method comprising the steps of using a processor to perform the following steps:
   eliminating the background and identifying foreground regions using color models in compressed and uncompressed domains;
   identifying one or more objects of interest (OOI) in low resolution, high occlusion levels;
   selecting an appropriate detection and tracking algorithm based on an estimated congestion level and an estimated occlusion level;
   detecting a group OOI;
   tracking the group OOI in low resolution, high occlusion levels;
   analyzing the surveillance area in low resolution, high occlusion levels; and
   identifying one or more individual OOIs.

2. The method of claim 1, wherein the step of eliminating the background and identifying foreground regions using color models in compressed and uncompressed domains comprises the steps of:
   adapting a background model using high-level temporal semantics;
   adapting the background model using high-level scene semantics;
   analyzing the surveillance area using a combination of high-level temporal abd high-level scene semantics; and
   improving the robustness of the background model with temporal statistics.

3. The method of claim 1, wherein the step of identifying one or more objects of interest (OOI) in low resolution, high occlusion levels comprises the steps of:
   extracting regions of interest that are divided into blocks based on a calibration of a camera used, and an analysis of sizes of objects in the area;
   computing templates for low and high frequency components of the blocks;
   training to match the computed templates to previously stored labeled templates; and
   comparing the computed templates to the previously stored labeled templates to identify OOIs.

4. The method of claim 1, wherein the step of selecting an appropriate detection and tracking algorithm based on an estimated congestion level and an estimated occlusion level comprises selecting one or more of group object tracking algorithms and individual object tracking algorithms.

5. The method of claim 1, wherein the step of tracking the group OOI in low resolution, high occlusion levels comprises the steps of:
   corresponding flow blocks to areas marked as potential OOI; and
   computing confidence levels for group movements based on motion parameters.

6. The method of claim 1, wherein the step of analyzing the surveillance area in low resolution, high occlusion levels comprises the steps of:
   estimating a congestion level;
   estimating a flow of a group OOI; and
   detecting possible events based on the estimated congestion level and flow.

7. The method of claim 1, wherein the step of identifying one or more individual OOIs comprises the steps of:
   matching image blocks to templates of OOI by combining weighted shape, color or motion patterns of image blocks obtaining one or more data elements;
   changing the weights of patterns by using the confidence levels of the patterns;
   forming a list of OOI detected in the surveillance area to match to different foreground regions;
   determining a pattern of motion of the OOI; and
   determining high-level semantics of the surveillance area.

* * * * *